No. 885,551. PATENTED APR. 21, 1908.
J. W. WARD.
SHAFT DETACHING MEANS.
APPLICATION FILED AUG. 12, 1907.
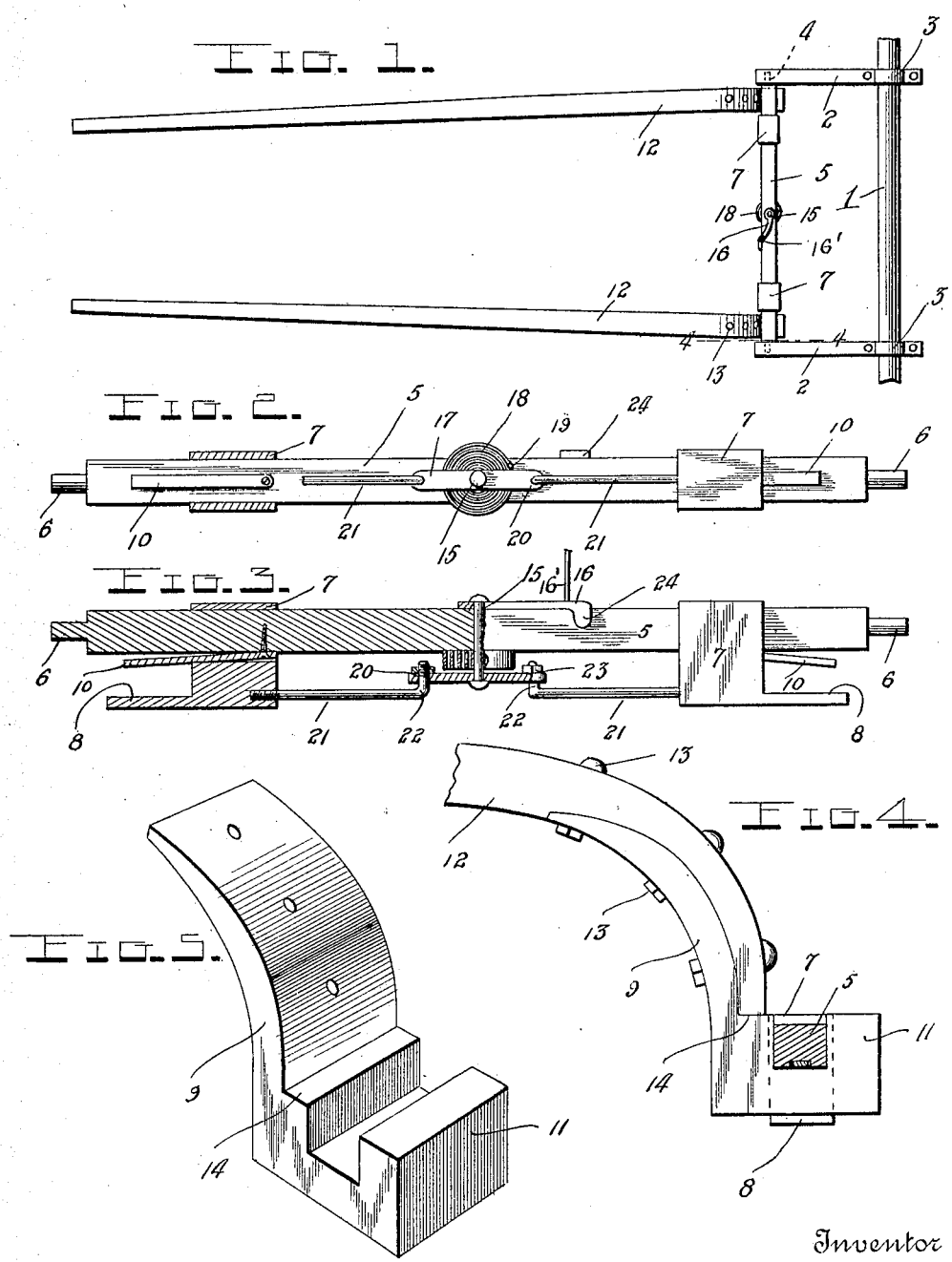
Witnesses
Chas. L. Griesbauer.
C. H. Griesbauer.
Inventor
Jonathan W. Ward.
by H. B. Willson & Co.
Attorneys

UNITED STATES PATENT OFFICE.

JONATHAN W. WARD, OF LARUE, OHIO.

SHAFT-DETACHING MEANS.

No. 885,551.　　　Specification of Letters Patent.　　　Patented April 21, 1908.

Application filed August 12, 1907. Serial No. 388,211.

*To all whom it may concern:*

Be it known that I, JONATHAN W. WARD, a citizen of the United States, residing at Larue, in the county of Marion and State of Ohio, have invented certain new and useful Improvements in Shaft-Detaching Means; and I do declare the following to be a full, clear, and exact description of the invention, such as will enable others skilled in the art to which it appertains to make and use the same.

This invention relates to shaft detaching means, and has for its object to provide a device by means of which the shafts of a vehicle can be quickly detached therefrom, and as quickly replaced.

By means of a device of this kind, in case of danger a driver can quickly detach the shafts from the vehicle and turn the horse to one side without danger of upsetting the vehicle or harming the occupant, and after the danger has passed, the shafts can be quickly replaced in their original position and the journey continued.

The invention will also permit of the shafts being removed from the vehicle, as, for instance, in a livery stable, whereby the vehicles can be stored or placed more closely, thereby economizing space. It will also permit of the same pair of shafts being used upon different vehicles without the trouble experienced in making such changes with the ordinary construction of connecting the shafts with the vehicle.

Referring to the accompanying drawings, which are for illustrative purposes only, and, therefore, are not drawn to scale, Figure 1 is a top plan view of the front axle of a vehicle with a pair of shafts, and my improved detaching means secured thereto; Fig. 2 is a bottom plan view of the detaching means, partly in section; Fig. 3 is a front elevation of the same, partly in section; Fig. 4 is a sectional view on the line 4—4 of Fig. 1; and Fig. 5 is a perspective view of one of the shaft irons.

Referring more particularly to the drawings, 1 indicates the axle, of a vehicle, to which my attachment is secured in any desired manner, preferably by means of brackets, 2. The brackets are preferably secured to the axle by means of clips, 3, and the forward end of each bracket is provided with a perforation, 4, within which perforation, a bar, 5, is journaled by means of pivots, 6.

The bar 5 is of any suitable size in cross section, preferably angular, and a block, 7, is reciprocally mounted upon each end thereof. An outwardly extending lip or projection, 8, is formed upon the underside of each block, and is adapted to engage with the lower side or surface of the shaft iron, 9, and thereby hold the shafts in position. A spring, 10, is preferably seated upon the lower side of the bar, 5, and is adapted to engage with the iron, 9, and prevent its rattling when in use. The rear end of the shaft iron, 9, extends upwardly to the rear of the bar 5 as shown at 11, and the shaft, 12, is secured at its rear end to the forward end of said iron as by means of bolts, 13. The iron is preferably provided with a shoulder, 14, for the reception of the rear end of the shaft, whereby a very strong and durable construction is secured.

Rotatably mounted substantially midway of the bar 5 is a short post or shaft 15, which is provided at its upper end with an arm 16, and at its lower end with a plate or lever, 17. Between the plate 17 and the lower side of the bar 5 is placed a spring, 18, one end of which is secured to the post, 15, and the other end is secured to a pin, 19, that projects from the bottom of said bar.

Pivotally connected with the plate or lever 17 as by means of perforations, 20, therein, are two rods, 21, whose outer ends are connected with the blocks, 7, as by being screw threaded thereinto. The inner ends of the rods are preferably bent at right-angles as shown at 22, and their tips are preferably provided with heads as nuts, 23, which will prevent their accidental removal from the perforations 20 in the plates, 17. The parts as above described are adapted to have the blocks 7 withdrawn so as to drop the shafts whenever the arm, 16, is given a sufficient movement forward by means of the upright 16', which is attached to arm 16 and extends into convenient position to be operated by the driver, and the free end of the arm is preferably provided with a lip, 24, for engaging with the front face of the bar when the parts stand in their normal position with the rods 21 extended or standing in alinement with each other so as to force the blocks out into position for holding the shafts in engagement with the bar.

As above described, it will be evident that when the shafts are held in their operative position, as shown more particularly in Fig. 4, the structure will be as strong and secure as if the shafts were connected with the vehicle in the ordinary manner. Whenever it is desired to detach the shafts, the driver or operator, as the case may be, swings the arm 16 forward, which will cause the two blocks on the ends of the bar to be simultaneously withdrawn or moved toward each other until the lips 8 move inward from under the shafts and thereby permit the shafts to fall by gravity, the springs 10 assisting in forcing the shafts downwardly in case they should have a tendency to stick to the bar.

When it is desired to replace the shafts, the arm is swung forward in the same manner as before, which will retract the blocks far enough for the shafts to be raised up into engagement with the bar, when, by releasing the arm, the spring will immediately return the parts to their normal position, thereby forcing the lips under the bottoms of the shaft irons and thereby securing the shafts in position.

Having thus fully described my invention, what I claim as new, and desire to secure by Letters-Patent, is:

1. In a shaft detacher, a pivotally mounted bar adapted to be connected with the front axle of a vehicle, shaft irons having depressions for engaging said bar, retaining members reciprocally mounted on said bar, each provided with a projecting lip for extension under the shaft irons for holding it in engagement with said bar, and spring pressed means for simultaneously moving said members.

2. In a shaft detacher, a pivotally mounted bar adapted to be connected with the axle of a vehicle, a block reciprocally mounted on each end of said bar and provided with a lip, a spring controlled post mounted in said bar and provided with a handle, means connected with said post for simultaneously reciprocating said blocks, and shaft irons between said projections on the blocks and said bar.

3. In a shaft detacher, a pivotally mounted bar adapted to be connected with the shaft of a vehicle, a spring upon the underside of each end of said bar, a block reciprocally mounted on each end of the bar and provided with an outwardly extending lip, a post journaled in said bar substantially midway of its length, an arm secured to the upper end of the post provided with a lip, a coiled spring, and a lever secured to the lower end of the post, and a rod from each block to said lever.

In testimony whereof I have hereunto set my hand in presence of two subscribing witnesses.

JONATHAN W. WARD.

Witnesses:
  WILLIE CLARK,
  A. J. MANLEY.